(12) United States Patent
Takeshita

(10) Patent No.: US 9,258,554 B2
(45) Date of Patent: Feb. 9, 2016

(54) STEREO VIDEO IMAGE DISPLAY APPARATUS AND STEREO VIDEO IMAGE DISPLAY METHOD

(71) Applicant: JVC KENWOOD Corporation, Yokohama-shi, Kanagawa (JP)

(72) Inventor: Hiroshi Takeshita, Hiratsuka (JP)

(73) Assignee: JVC KENWOOD CORPORATION, Yokohama-Shi (JP)

(*) Notice: Subject to any disclaimer, the term of this patent is extended or adjusted under 35 U.S.C. 154(b) by 399 days.

(21) Appl. No.: 13/785,760

(22) Filed: Mar. 5, 2013

(65) Prior Publication Data

US 2013/0235171 A1 Sep. 12, 2013

(30) Foreign Application Priority Data

Mar. 6, 2012 (JP) .................................. 2012-048885
Mar. 6, 2012 (JP) .................................. 2012-048886

(51) Int. Cl.
*H04N 13/04* (2006.01)
(52) U.S. Cl.
CPC .................................. *H04N 13/0438* (2013.01)
(58) Field of Classification Search
CPC .. H04N 13/0438; H04N 13/04; G09G 3/3648
See application file for complete search history.

(56) References Cited

U.S. PATENT DOCUMENTS

| 5,300,942 A * | 4/1994 | Dolgoff ........................... 345/32 |
| 2008/0170293 A1 * | 7/2008 | Lucente et al. ............... 359/463 |
| 2012/0056856 A1 * | 3/2012 | Woo et al. ..................... 345/204 |
| 2012/0287139 A1 * | 11/2012 | Wyatt ............................. 345/520 |
| 2012/0327072 A1 * | 12/2012 | Jeon et al. ..................... 345/419 |

FOREIGN PATENT DOCUMENTS

| JP | 06-178325 A | 6/1994 |
| JP | 08-327961 A | 12/1996 |
| JP | 2001258052 A | 9/2001 |
| JP | 2011-040946 A | 2/2011 |
| JP | 2011-252943 A | 12/2011 |

OTHER PUBLICATIONS

Japanese Office Action dated May 20, 2015 issued in corresponding Japanese Patent Application No. 2012-048886.

* cited by examiner

*Primary Examiner* — Kate Luo
(74) *Attorney, Agent, or Firm* — Nath Goldberg & Meyer; Jerald L. Meyer; Stanely N. Protigal

(57) ABSTRACT

A stereo video image display apparatus includes a data obtaining unit, a video image generator and an image quality degradation unit. The data obtaining unit obtains left eye video image data and right eye video image data. The video image generator generates sequential data in which a left eye video image data sequence repeating the left eye video image data and a right eye video image data sequence repeating the right eye video image data are arranged alternately to generate a control signal controlling opening and closing of shutter glasses according to the sequential data. The image quality degradation unit processes image quality degradation for object data which is frame data corresponding to one frame either before the switching between the left eye video image data and the right eye video image data and one frame after the switching, or two frames before and after the switching.

12 Claims, 11 Drawing Sheets

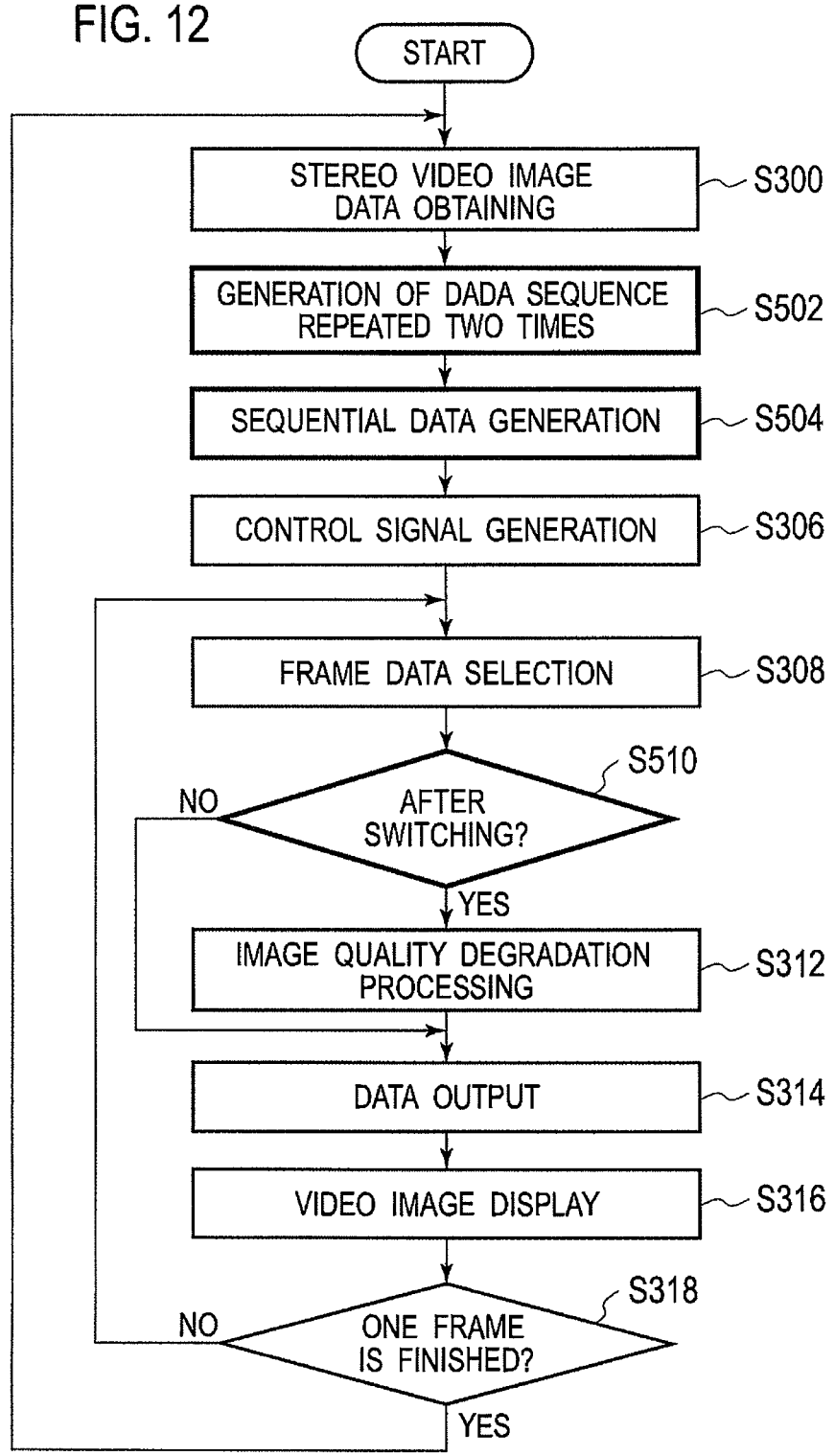

STEREO VIDEO IMAGE DISPLAY APPARATUS AND STEREO VIDEO IMAGE DISPLAY METHOD

CROSS REFERENCE TO RELATED APPLICATION

This application claims benefit of priority under 35 U.S.C. §119 to Japanese Patent Applications No. 2012-048885 filed on Mar. 6, 2012 and No. 2012-048886 filed on Mar. 6, 2012, the entire contents of which are incorporated by reference herein.

BACKGROUND

The present invention relates to a stereo video image display apparatus and a stereo video image display method that displays a video image which is perceived as a stereo video image through shutter glasses.

Recently, there has been highlighted a stereo video image technique in which two video images of right and left video image data sets having binocular parallax (left eye video image data and right eye video image data) are alternately displayed on a display unit with a predetermined frame period to cause a user wearing shutter glasses to perceive a stereo video image.

The shutter glasses are configured to have two shutters which are opened and closed in synchronization with a predetermined frame period of the video image data, and open a left eye shutter and close a right eye shutter during a period in which a left eye video image is displayed on a display unit according to the left eye video image data. On the other hand, the shutter glasses are configured to open the right eye shutter and close the left eye shutter during a period in which a right eye video image is displayed on the display unit according to the right eye video image data (e.g., Patent Literature 1: Japanese Patent Application Laid-Open No. H08 (1996)-327961, and Patent Literature 2: Japanese Patent Application Laid-Open No. H06 (1994)-178325).

When the left eye video image and the right video image are displayed alternately, since video image switching speed is limited in a display unit, a part of one video image of the left eye video image and the right eye video image remains as a residual image and is mixed to be displayed into the other video image. As a result of this, so-called crosstalk is caused. When the crosstalk is caused, an outline of an object or the like is visually recognized doubly by a user, for example, and a poor video image is obtained.

Accordingly, there has been used a configuration in which each of the left eye video image of the same frame and the right eye video image of the same frame is displayed continuously in plural times. For example, when the left eye video image is switched to the right eye video image and a part of the left eye video image is mixed into the right eye video image to cause the crosstalk, the right eye video image of the same frame is displayed again immediately. Then, in the case of liquid crystal monitor, for example, a voltage or the like for displaying the video image of the same frame is applied in plural times. Thereby, compared to the case of the voltage application only in one time, it is possible to shorten a time required for switching the left eye video image mixed into the right eye video image, completely to the right eye video image. However, the crosstalk remains even though a short time immediately after the left eye video image has been switched to the right eye video image or the right eye video image has been switched to the left eye video image.

Accordingly, there is known a technique which suppresses an influence of the crosstalk by closing both of the two left and right shutters during a period in which a video image having the crosstalk is displayed. Further, sometimes there is used a countermeasure of switching off a backlight during a period in which a video image having the crosstalk is displayed. However, in both cases, a time in which the left eye video image and the right eye video image are recognized visually becomes shorter, thereby resultantly brightness of the video image to be perceived is decreased.

SUMMARY

In view of the above-mentioned problem, the present invention aims to provide a stereo video image display apparatus and a stereo video image display method which can improve visibility by reducing crosstalk between a left eye video image and a right eye video image without reducing brightness of a video image.

For achieving the above-mentioned object, there is provided a stereo video image display apparatus according to one aspect of the present invention, including: a data obtaining unit that obtains left eye video image data and right eye video image data for stereo video image perception by binocular parallax; a video image generator that generates sequential data in which a left eye video image data sequence repeating the obtained left eye video image data in a predetermined number of times and a right eye video image data sequence repeating the obtained right eye video image data in a predetermined number of times are arranged alternately to generate a control signal which controls opening and closing of shutter glasses according to the sequential data; an image quality degradation unit that processes image quality degradation for object data which is frame data corresponding to either one of one frame before switching between the left eye video image data and the right eye video image data and one frame after the switching or object data which is frame data corresponding to two frames before and after the switching, in the sequential data; and a display unit that displays a video image according to the sequential data after image quality of the object data has been degraded.

For achieving the above-mentioned object, there is provided a stereo video image display method according to one aspect of the present invention, including: obtaining left eye video image data and right eye video image data for stereo video image perception by binocular parallax; generating sequential data in which a left eye video image data sequence repeating the obtained left eye video image data in a predetermined number of times and a right eye video image data sequence repeating the obtained right eye video image data in a predetermined number of times are arranged alternately to generate a control signal which controls opening and closing of shutter glasses according to the sequential data; processing image quality degradation for object data which is frame data corresponding to either one of one frame before switching between the left eye video image data and the right eye video image data and one frame after the switching or object data which is frame data corresponding to two frames before and after the switching, in the sequential data; and displaying a video image according to the sequential data after image quality of the object data has been degraded.

For achieving the above-mentioned object, there is provided a stereo video image display apparatus according to one aspect of the present invention, including: a data obtaining unit that obtains left eye video image data and right eye video image data for stereo video image perception by binocular parallax; a video image generator that generates sequential data in which a left eye video image data sequence repeating the obtained left eye video image data in two times and a right eye video image data sequence repeating the obtained right eye video image data in two times are arranged alternately to generate a control signal which controls opening and closing of shutter glasses according to the sequential data; an image quality degradation unit that processes image quality degradation for object data which is frame data corresponding to either one of one frame after the switching between the left eye video image data and the right eye video image data and one frame before the switching, in the sequential data; and a display unit that displays a video image according to the sequential data after image quality of the object data has been degraded.

For achieving the above-mentioned object, there is provided a stereo video image display method according to one aspect of the present invention, including: obtaining left eye video image data and right eye video image data for stereo video image perception by binocular parallax; generating sequential data in which a left eye video image data sequence repeating the obtained left eye video image data in two times and a right eye video image data sequence repeating the obtained right eye video image data in two times are arranged alternately to generate a control signal which controls opening and closing of shutter glasses according to the sequential data; processing image quality degradation for object data which is frame data corresponding to either one of one frame after switching between the left eye video image data and the right eye video image data and one frame before the switching, in the sequential data; and displaying a video image according to the sequential data after image quality of the object data has been degraded.

According to the present invention, it is possible to improve visibility by reducing crosstalk between a left eye video image and a right eye video image without reducing brightness of a video image.

BRIEF DESCRIPTION OF THE DRAWINGS

FIG. 12 is a flowchart showing a whole flow of a stereo video image display method in the second embodiment.

DETAILED DESCRIPTION

Hereinafter, preferable embodiments of the present invention will be explained in detail with reference to the attached drawings. A size, a material, and other specific numerical values and the like described in these embodiments are only illustrations for easy understanding of the invention, and do not limit the present invention unless otherwise specified. Note that, in the present specification and the drawings, an element having substantially the same function and configuration is denoted by the same sign and thereby duplicated explanation will be omitted, and an element which does not have a direct relationship with the present invention will be omitted from the drawings.

First Embodiment

Stereo Video Image Display System 100

Figure 1:
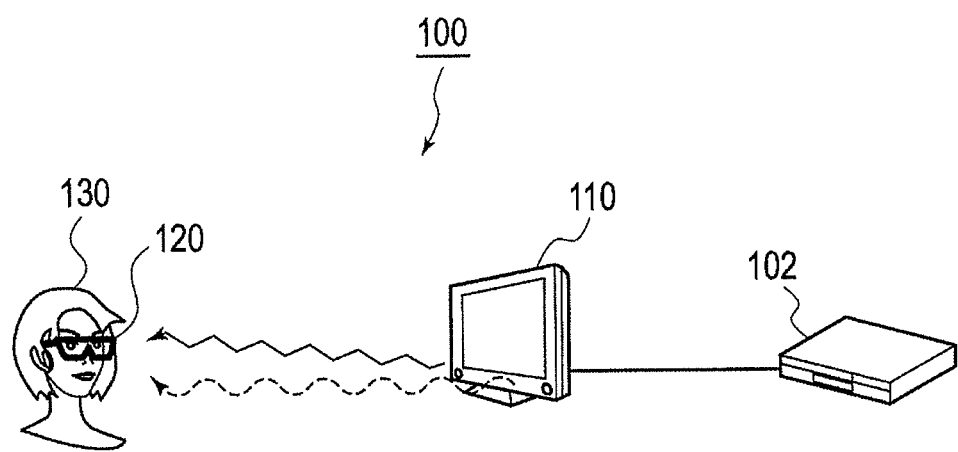
FIG. 1 is an explanatory diagram showing a schematic connection relationship of a stereo video image display system in a first embodiment.

FIG. 1 is an explanatory diagram showing a schematic connection relationship of a stereo video image display system 100 in a first embodiment. As shown in FIG. 1, the stereo video image display system 100 includes a video image reproduction apparatus 102, a stereo video image display apparatus 110, and shutter glasses 120.

The video image reproduction apparatus 102 outputs stereo video image data which includes two video image data sets having binocular parallax (left eye video image data and right eye video image data) to the stereo video image display apparatus 110 in a predetermined method for stereo video image perception such as a side-by-side method, a top-and-bottom method, a line-by-line method, or a frame sequential method.

The stereo video image display apparatus 110 is a liquid crystal panel type display apparatus, for example, and sequentially displays a left eye video image and a right eye video image output from the video image reproduction apparatus 102 according to various types of stereo video image data, and displays a stereo video image using the frame sequential system in which the stereo video image is recognized visually through the shutter glasses 120.

When a user 130 wears the shutter glasses 120 and the shutter glasses 120 is positioned between the stereo video image display apparatus 110 and the user 130, the shutter glasses 120 open and close a right eye shutter and a left eye shutter to cause the left eye of the user 130 to visually recognize the left eye video image and cause the right eye of the user 130 to visually recognize the right eye video image. In this manner, the user 130 can perceive the video image sterically.

Subsequently, specific configurations of the stereo video image display apparatus 110 and the shutter glasses 120 will be explained.

(Stereo Video Image Display Apparatus 110)

Figure 2:
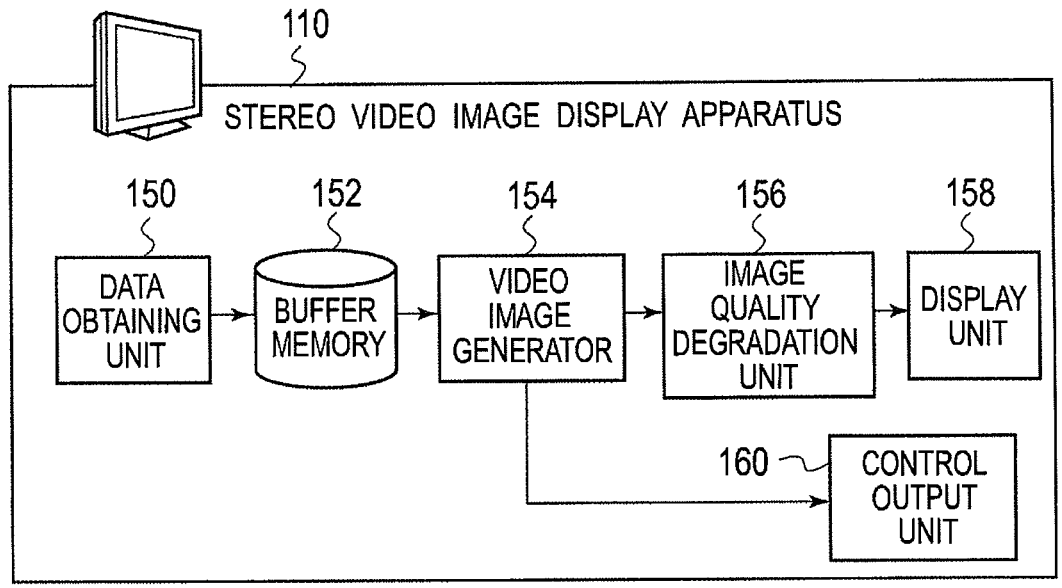
FIG. 2 is a functional block diagram showing a schematic connection relationship of a stereo video image display apparatus in the first embodiment.

FIG. 2 is a functional block diagram showing a schematic connection relationship of the stereo video image display apparatus 110 in the first embodiment. As shown in FIG. 2, the stereo video image display apparatus 110 includes a data obtaining unit 150, a buffer memory 152, a video image generator 154, an image quality degradation unit 156, a display unit 158, and a control output unit 160.

The data obtaining unit 150 obtains stereo video image data (right eye video image data and left eye video image data) which is data used to form the right eye video image and the left eye video image for stereo video image perception, from the video image reproduction apparatus 102, for example.

The buffer memory 152 includes a RAM, a flash memory, an HDD, or the like, and temporarily retains the stereo video image data obtained by the data obtaining unit 150.

The video image generator 154 reads out the stereo video image data sequentially from the buffer memory 152 and generates a left eye video image data sequence and a right eye video image data sequence by repeating frame data corresponding to one frame in a predetermined number of times (three times in the present embodiment) for the respective left eye video image data and right eye video image data composing the stereo video image data.

Then, the video image generator 154 generates sequential data in which the left eye video image data sequence and the right eye video image data sequence are arranged alternately. Further, the video image generator 154 generates a control signal which controls opening and closing of the shutter glasses 120 according to the generated sequential data.

The image quality degradation unit 156 is configured with a filter and performs image quality degradation processing which degrades image quality by providing filtering for object data which is either one or both of frame data sets before and after switching between the left eye video image data and the right eye video image data in the generated sequential data. The image quality degradation processing by the image quality degradation unit 156 will be described in detail below.

The display unit 158 is configured with a liquid crystal panel, for example, and sequentially displays the right eye video image and the left eye video image having binocular parallax according to the sequential data after image quality of the object data has been degraded.

The control output unit 160 generates a control signal which controls opening and closing timing in each of right and left shutters of the shutter glasses 120 (left eye shutter 224 and right eye shutter 226 to be described below) according to a frame period of the sequential data, and outputs the control signal to the shutter glasses 120 through wireless communication such as infrared communication of the IrDA (Infrared Data Association) standard.

(Shutter Glasses 120)

Figure 3:
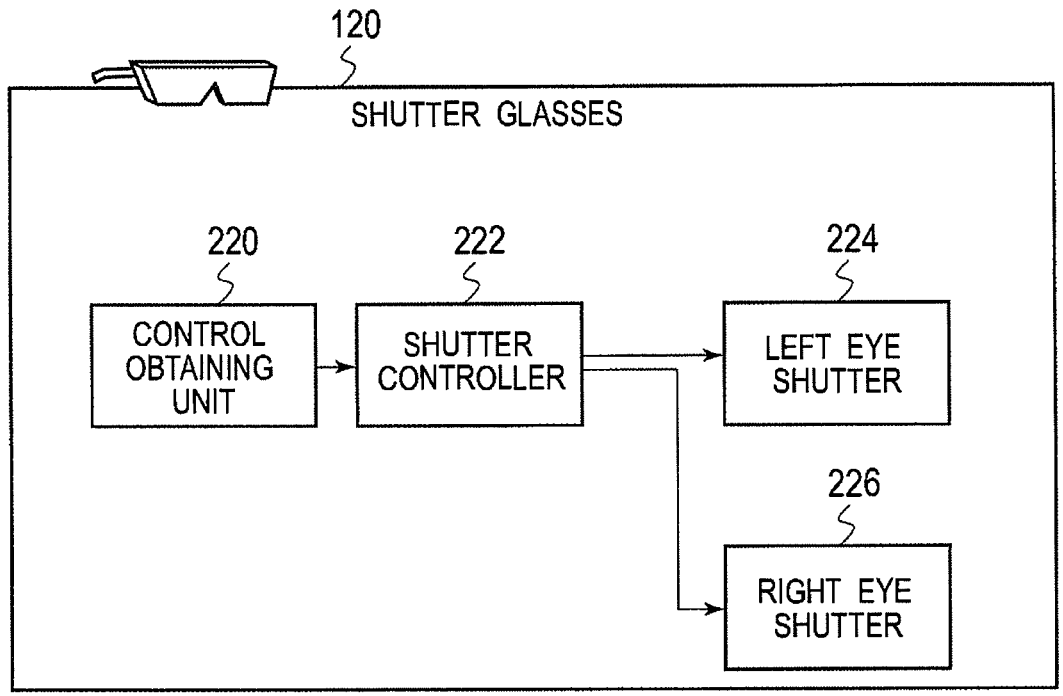
FIG. 3 is a functional block diagram showing a schematic connection relationship of shutter grasses in the first embodiment.

FIG. 3 is a functional block diagram showing a schematic connection relationship of the shutter glasses 120 in the first embodiment. As shown in FIG. 3, the shutter glasses 120 includes a control obtaining unit 220, a shutter controller 222, a left eye shutter 224, and a right eye shutter 226.

The control obtaining unit 220 obtains the control signal output from the control output unit 160. The shutter controller 222 controls the opening and closing timing of the right eye shutter 226 and the left eye shutter 224 according to the control signal obtained by the control obtaining unit 220.

When the user 130 wears the shutter glasses 120, the right eye shutter 226 being positioned in front of the right eye, opens and closes a light path which allows light input to the right eye. When the user 130 wears the shutter glasses 120, the left eye shutter 224 being positioned in front of the left eye, opens and closes a light path which allows light input to the left eye.

In the above, the schematic configurations of the stereo video image display apparatus 110 and the shutter glasses 120 have been explained. Subsequently, the image quality degradation processing which is a feature of the present embodiment will be explained in detail, and then effect of the stereo video image display apparatus 110 will be explained, compared to a comparison example.

Figure 4A:
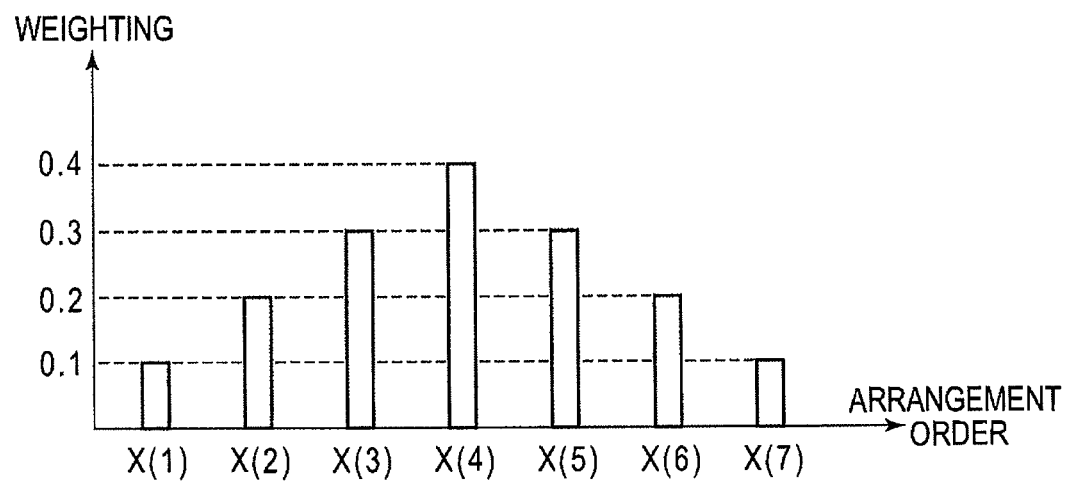
FIGS. 4A and 4B are explanatory diagrams for explaining image quality degradation processing.
Figure 4B:
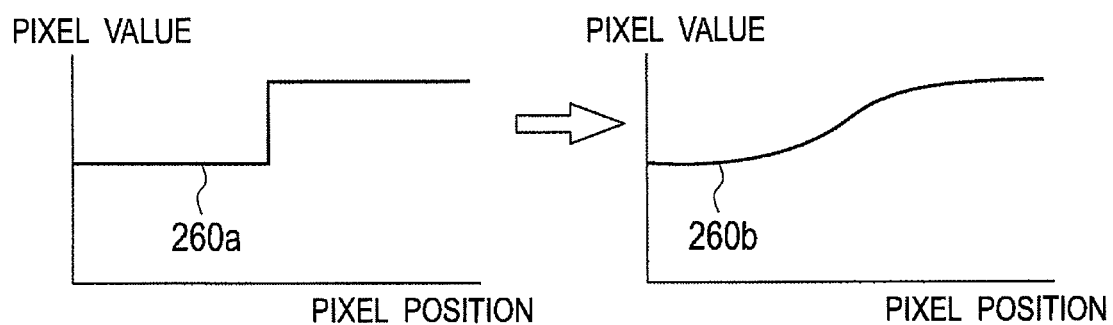

FIGS. 4A and 4B are explanatory diagrams for explaining the image quality degradation processing. As shown in a conceptual diagram of FIG. 4A, the image quality degradation unit 156 is configured with a filter including a plurality of (seven in the present embodiment) shift registers X(1) to X(7).

For the shift registers X(1) to X(7), weighting coefficients of 0.1, 0.2, 0.3, 0.4, 0.3, 0.2 and 0.1 are allotted to the shift registers X(1), X(2), X(3), X(4), X(5), X(6) and X(7), respectively. Here, for any one pixel, pixel values of three pixels neighboring on the right side and three pixels neighboring on the left side (total seven pixels) are also read out and averaged after the above weighting has been applied. Then, the averaged value is set to be a pixel value of the any one pixel after the image quality degradation processing.

The image quality degradation unit 156 uses both frame data sets before and after the switching between the left eye video image data and the right eye video image data in the sequential data as the object data, in the present embodiment, and stores read out pixel values sequentially into the shift registers X(1) to X(7). Accordingly, when seven pixel values are stored, a pixel value stored first is stored in X(7) and a pixel value stored last is stored in X(1). Here, the pixel value to be processed by the image quality degradation unit 156 is a brightness value of each pixel or the like, for example.

In this manner, the image quality degradation unit 156 stores the pixel value of one pixel in the object data one by one into the shift registers X(1) to X(7). As a result, there is a state in which a newer (input temporally later) pixel value is stored in a shift register close to the shift register X(1) and an older (input temporally earlier) pixel value is stored in a shift register close to the shift register X(7).

Then, the image quality degradation unit 156 multiplies the shift registers X(1) to X(7) by respective allotted weighting coefficients, sums up the pixel values after the multiplication, and divides the sum by 1.6. Then, the image quality degradation unit 156 outputs the divided value as a pixel value after the image quality degradation processing for a pixel corresponding to the shift register X(4).

Subsequently, the data in the shift register X(7) is deleted. The pixel values stored in the shift registers X(1) to X(6) are brought forward to the shift registers X(2) to X(7), respectively. Further, a pixel value of new one pixel is stored into the shift register X(1).

In FIG. 4B, waveform images of pixel values 260a and 260b are shown for the object data sets before and after the input to the image quality degradation unit 156. When the above described processing from the weighting coefficient multiplication to the data bringing forward is repeated, the output pixel value (pixel value stored in the shift register X(4)) becomes close to the pixel values of the neighboring pixels.

Accordingly, abrupt change of the pixel values is relaxed, and the pixel value comes to change smoothly from the waveform image 260a to the waveform image 260b in FIG. 4B. That is, the image quality degradation unit 156 functions as a digital filter which eliminates a high-frequency component and passes a low-frequency component. Here, while explanation is provided for a case in which the image quality degradation unit 156 is a digital filter, the image quality degradation unit 156 may be an analog filter.

In this manner, after having passed through the image quality degradation unit 156 which functions as the digital filter, the video image expressed by the object data becomes an obscure video image in which a vicinity of an object outline and the like has a gradual change at a part where the pixel value changes abruptly. That is, the image quality degradation unit 156 degrades the image quality of the object data by obscuring an outline in the object data (image quality degradation processing).

By the configuration of causing the image quality degradation unit 156 to function as a filter, it is possible to perform the image quality degradation processing of the object data only by causing the object data to pass through the filter. Accordingly, complicated control becomes unnecessary, it becomes possible to reduce production cost of the stereo video image display apparatus 110.

Figure 5:
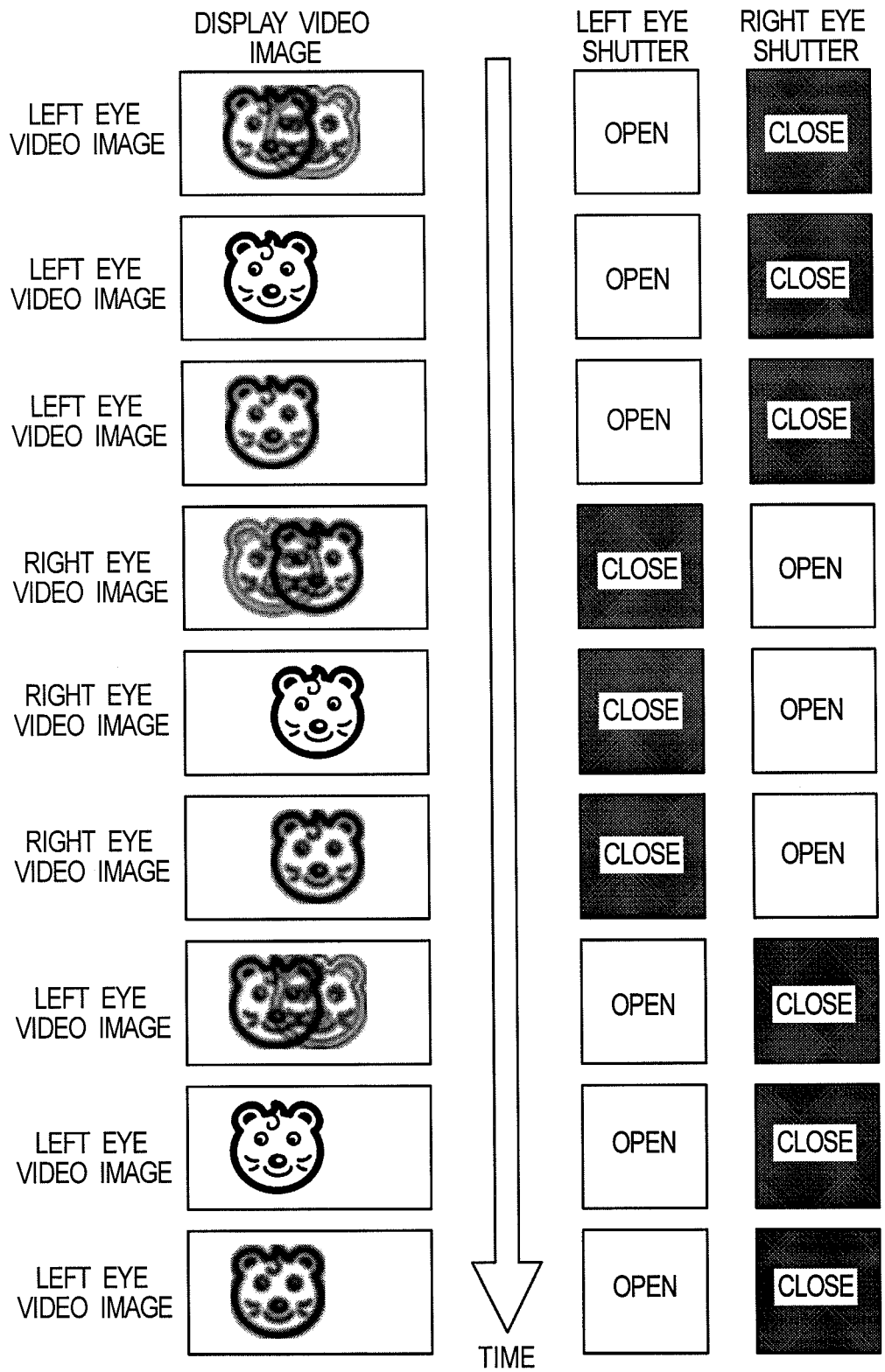
FIG. 5 is an explanatory diagram for explaining a video image to be displayed on a display unit and opening and closing timing of shutter glasses in the first embodiment.
Figure 6:
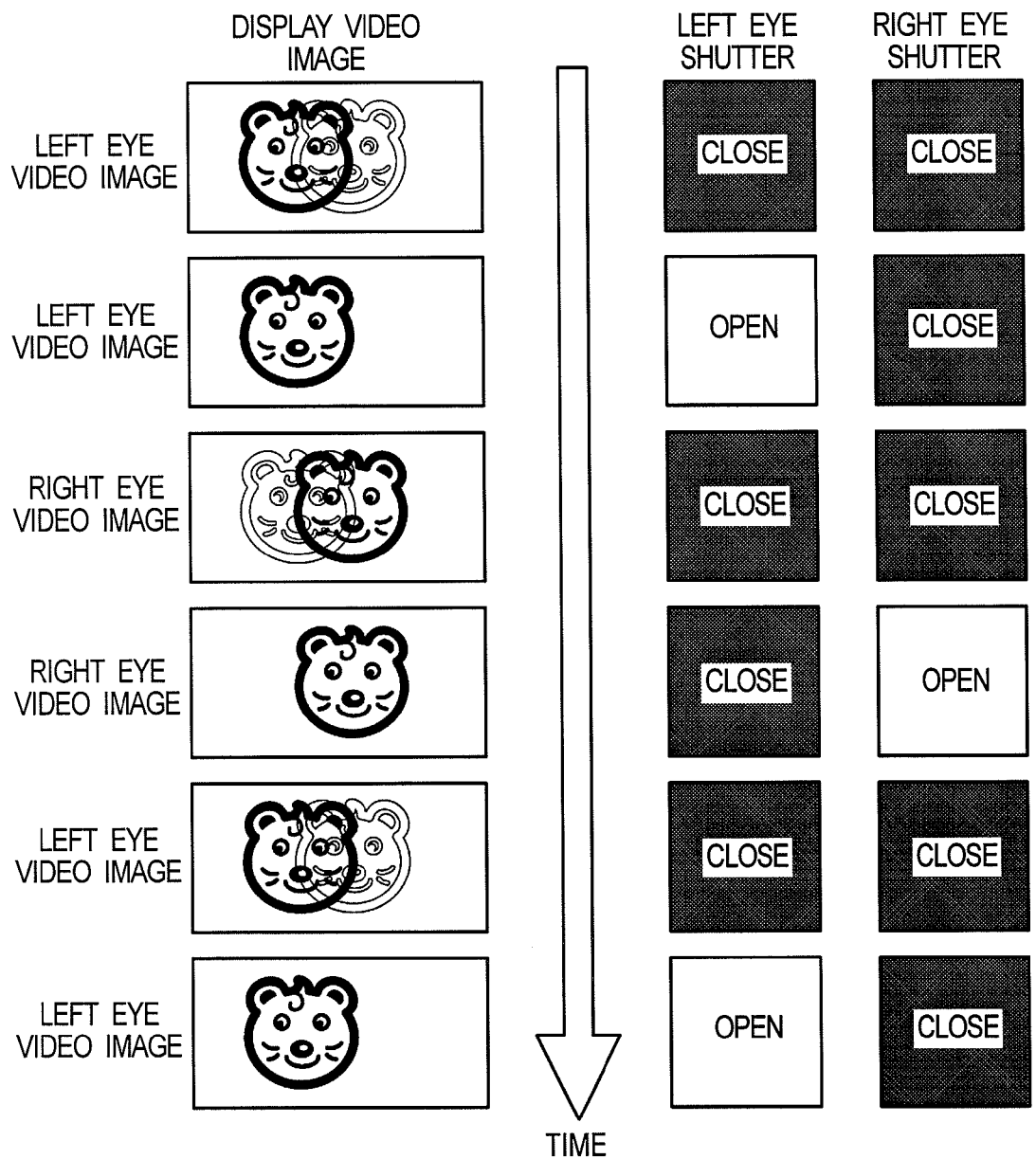
FIG. 6 is an explanatory diagram for explaining a video image to be displayed on a display unit and opening and closing timing of shutter glasses in a comparison example.

FIG. 5 is an explanatory diagram for explaining a video image to be displayed on the display unit 158 and opening and closing timing of the shutter glasses 120 in the first embodiment. FIG. 6 is an explanatory diagram for explaining a video image to be displayed on a display unit and opening and closing timing of shutter glasses in a comparison example.

In the video image to be displayed on the display unit 158 (hereinafter, called display video image), a part of one video image out of the left eye video image and the right eye video image remains as a residual image and is mixed to be displayed in the other video image after the switching between the left eye video image and the right eye video image, and so-called crosstalk is caused. When the crosstalk is caused, an outline of an object or the like is visually recognized doubly by the user 130, for example, and a poor video image is obtained.

So as to cause the user 130 not to recognize this crosstalk visually, the comparison example shown in FIG. 6 displays the left eye video image of the same one frame in two times and the right eye video image of the same one frame in two times, and closes both of the left eye shutter and the right eye shutter of the shutter glasses while the video image having the crosstalk is displayed.

In such a configuration of the comparison example, an opening time becomes one third of a closing time in each of the left eye shutter and the right eye shutter. That is, each of the left eye shutter and the right eye shutter is closed for three forth of the whole time and a dark video image is recognized visually.

In the present embodiment, as shown in FIG. 5, the image quality degradation unit 156 sets both frame data sets before and after the switching between the left eye video image and the right eye video image as the object data and provides the above described image quality degradation processing, that is, the processing of obscuring an outline in the object data. Then, a video image immediately before (hereinafter, called previous video image) and a video image immediately after (hereinafter, called subsequent video image) the switching between the left eye video image and the right eye video image are obscured, and thereby the crosstalk is not recognized clearly. Accordingly, it is not necessary to shield the corresponding video image in question with the shutter glasses 120.

For this purpose, the video image generator 154 generates the control signal, for the left eye video image data, for opening the left eye shutter 224 and closing the right eye shutter 226 in the shutter glasses 120 during the whole period in which the video image according to the frame data repeated in three times (left eye video image data sequence) is displayed; and for the right eye video image data, for closing the left eye shutter 224 and opening the right eye shutter 226 in the shutter glasses 120 during the whole period in which the video image according to the frame data repeated in three times (right eye video image data sequence) is displayed.

Then, according to this control signal, the shutter controller 222 of the shutter glasses 120, for the left eye video image data, opens the left eye shutter 224 and closes the right eye shutter 226 in the shutter glasses 120 during the whole period in which the video image according to the frame data repeated in three times is displayed; and for the right eye video image data, closes the left eye shutter 224 and opens the right eye shutter 226 in the shutter glasses 120 during the whole period in which the video image according to the frame data repeated in three times is displayed.

Therefore, the stereo video image display apparatus 110 can open each of the left eye shutter 224 and the right eye shutter 226 for a half time of the whole period, and can reduce the crosstalk between the left eye video image and the right eye video image without reducing the video image brightness to improve the visibility of the video image.

Variation Example

Figure 7A:
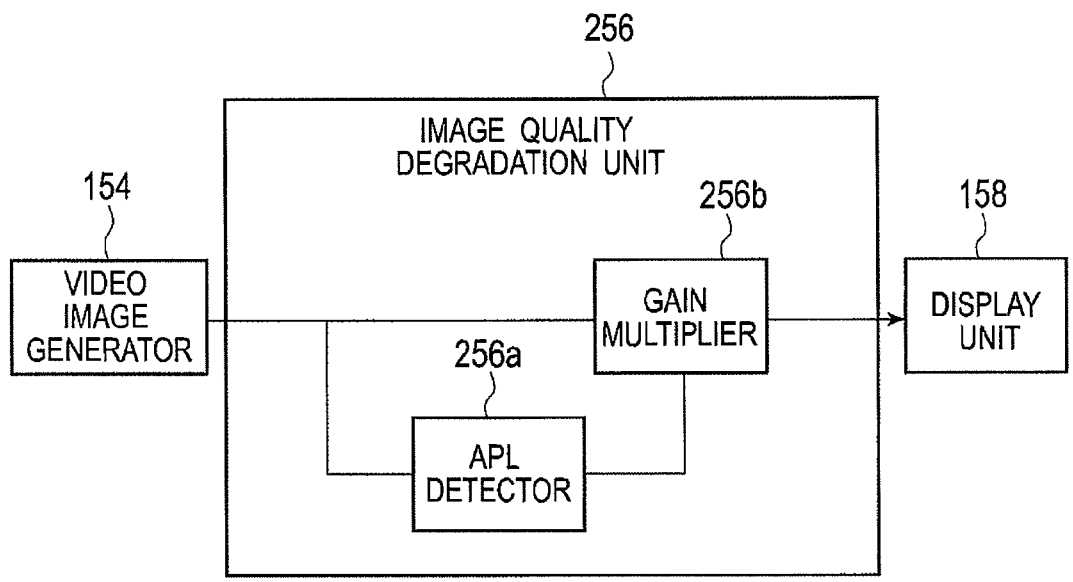
FIGS. 7A and 7B are explanatory diagrams for explaining a variation example.
Figure 7B:
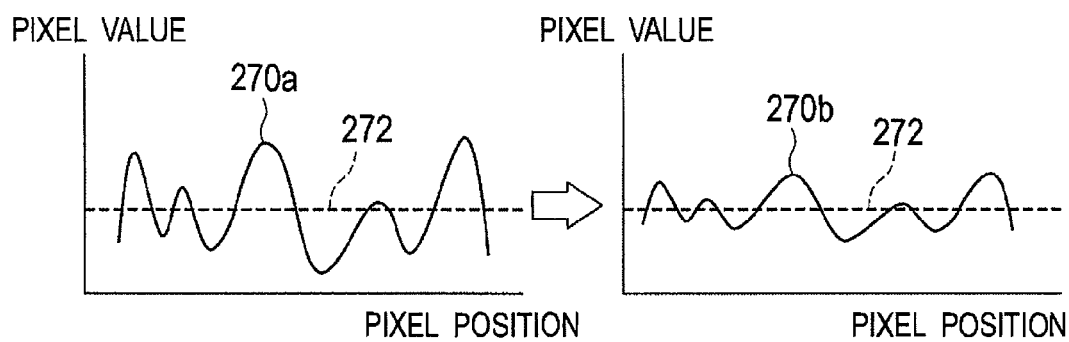

FIGS. 7A and 7B are explanatory diagrams for explaining a variation example. FIG. 7A is a functional block diagram for explaining a configuration of an image quality degradation unit 256 in the variation example. As shown in FIG. 7A, the image quality degradation unit 256 includes an APL detector 256a and a gain multiplier 256b.

The APL detector 256a calculates an average picture level (APL) for the object data in the sequential data output from the video image generator 154.

The gain multiplier 256b multiplies a difference between each pixel value and the average picture level by a gain which is smaller than one. Then, the gain multiplier 256b adds the average picture level to the multiplied value. In this manner, the gain multiplier 256b reduces a range of the pixel values centering the average picture level calculated by the APL detector 256a. After that, the gain multiplier 256b outputs the sequential data to the display unit 158 including the object data in which the range is reduced.

FIG. 7B shows waveform images of the pixel values 270a and 270b for the object data sets before and after the input to the gain multiplier 256b. Compared to the waveform image 270a, the waveform image 270b which has passed through the gain multiplier 256b has smaller amplitude centering the APL 272. In other words, the pixel value of the object data comes to have a smaller change width after having passed through the gain multiplier 256b.

In this manner, after having passed through the image quality degradation unit 256, the video image expressed by the object data has a narrower range of the pixel value, for example, the brightness value. That is, the image quality degradation unit 256 degrades the image quality of the object data by narrowing a contrast range of the object data (image quality degradation processing).

Figure 8:
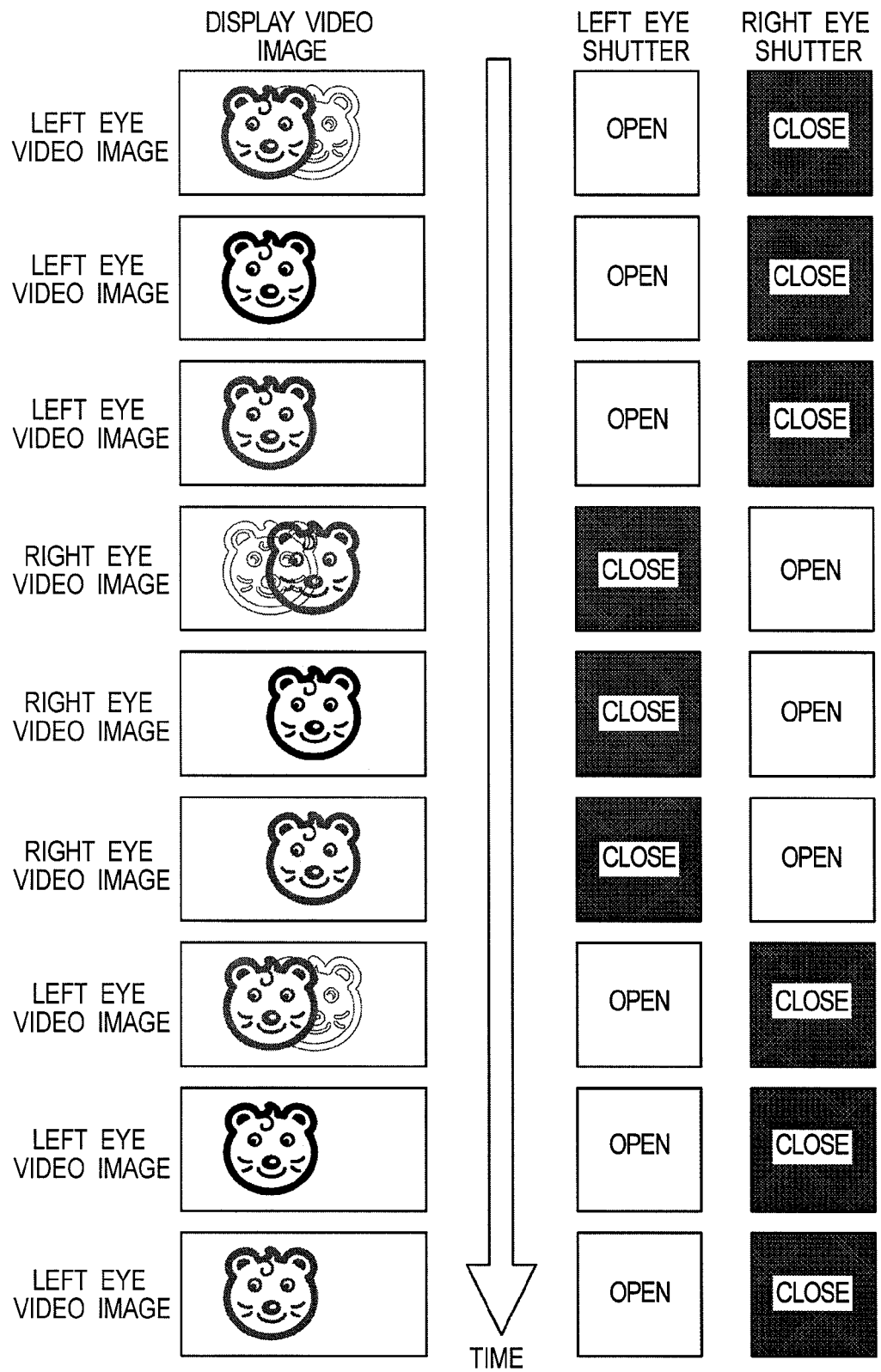
FIG. 8 is an explanatory diagram for explaining a video image to be displayed on a display unit and opening and closing timing of shutter glasses in a variation example.

FIG. 8 is an explanatory diagram for explaining a video image to be displayed on the display unit 158 and opening and closing timing of the shutter glasses 120 in the variation example.

As shown in FIG. 8, the image quality degradation unit 256 sets both frame data sets before and after the switching between the left eye video image and the right eye video image as the object data and provides the above described image quality degradation processing, that is, the processing of narrowing the contrast range of the object data.

Then, each of the previous video image and the subsequent video image comes to have a lower contrast and the crosstalk is not recognized clearly, and therefore it is not necessary to shield the corresponding video image with the shutter glasses 120. In this manner, it is possible to open each of the left eye shutter 224 and the right eye shutter 226 for a half time of the whole period and to reduce the crosstalk between the left eye video image and the right eye video image without reducing the video image brightness to improve the visibility of the video image.

(Stereo Video Image Display Method)

Figure 9:
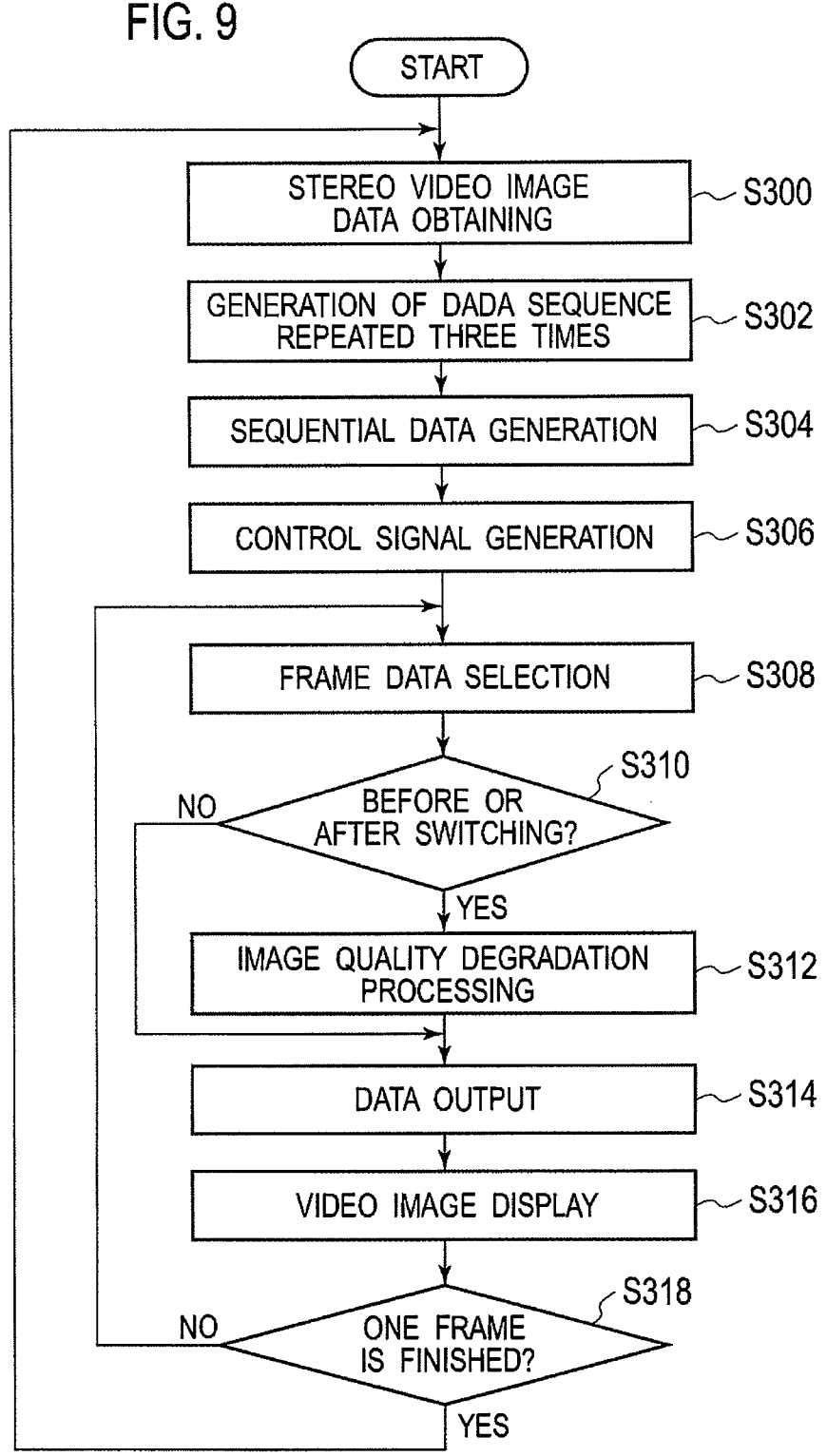
FIG. 9 is a flowchart showing a whole flow of a stereo video image display method in the first embodiment.

Next, there will be explained a stereo video image display method which displays the sequential data using the above described stereo video image display apparatus 110. FIG. 9 is a flowchart showing a whole flow of the stereo video image display method in the first embodiment. The processing shown in FIG. 9 is carried out repeatedly at a predetermined period while the stereo video image display apparatus 110 is instructed to display the sequential data.

The data obtaining unit 150 obtains one frame of the stereo video image data (one frame in each of the left eye video image data and the right eye video image data) from the video image reproduction apparatus 102, for example, and stores the stereo video image data into the buffer memory 152 (S300). The video image generator 154 reads out one frame of the stereo video image data from the buffer memory 152, and generates the left eye video image data sequence and the right eye video image data sequence by repeating the frame data corresponding to one frame in three times for the respective left eye video image data and right eye video image data composing the stereo video image data (S302).

The video image generator 154 generates the sequential data in which the continuing left eye video image data sequence and the continuing right eye video image data sequence are arranged alternately (S304). Further, the video image generator 154 generates the control signal which controls opening and closing of the shutter glasses 120 according to the generated sequential data (S306). The control output unit 160 outputs the generated control signal sequentially to the shutter glasses 120.

Then, the image quality degradation unit 156 selects one frame data sequentially from the sequential data (S308). Then, the image quality degradation unit 156 determines whether or not the selected frame data corresponds to a position either before or after the switching between the left eye video image data and the right eye video image data (whether object data or not) (S310).

If the selected frame data is the object data (YES in S310), the image quality degradation unit 156 provides the image quality degradation processing (S312). If the selected frame data is not the object data (NO in S310), the image quality degradation processing is not provided.

Successively, the image quality degradation unit 156 outputs the frame data to the display unit 158 after having provided the image quality degradation processing if the selected frame data is the object data, and outputs the frame data as it is to the display unit 158 if the selected frame data is not the object data (S314). The display unit 158 displays the left eye video image or the right eye video image according to the output sequential data (S316).

Then, the image quality degradation unit 156 determines whether or not the whole frame data has been selected in one frame of the stereo video image data (one frame in each of the left eye video image data and the right eye video image data) (S318). When unselected frame data still remains (NO in S318), the process goes to the frame data selection step S308. When the whole frame data has been selected (YES in S318), the process goes to the stereo video image data obtaining step S300.

Also by such a stereo video image display method, it is possible to reduce the crosstalk between the left eye video image and the right eye video image without reducing the video image brightness and to improve the visibility of the video image.

Second Embodiment

In the above described first embodiment, explanation was provided for the stereo video image display apparatus 110 which displays each of the same left eye video image and the same right eye video image continuously in three times on the display unit 158. In a second embodiment, there will be explained a stereo video image display apparatus 410 which displays each of the same left eye video image and the same right eye video image continuously in two times on the display unit 158. Note that shutter glasses 120 which configure a stereo video image display system together with a stereo video image display apparatus 410 has substantially the same function as the above described shutter glasses 120 in the first embodiment, thereby duplicated explanation will be omitted.

(Stereo Video Image Display Apparatus 410)

Figure 10:
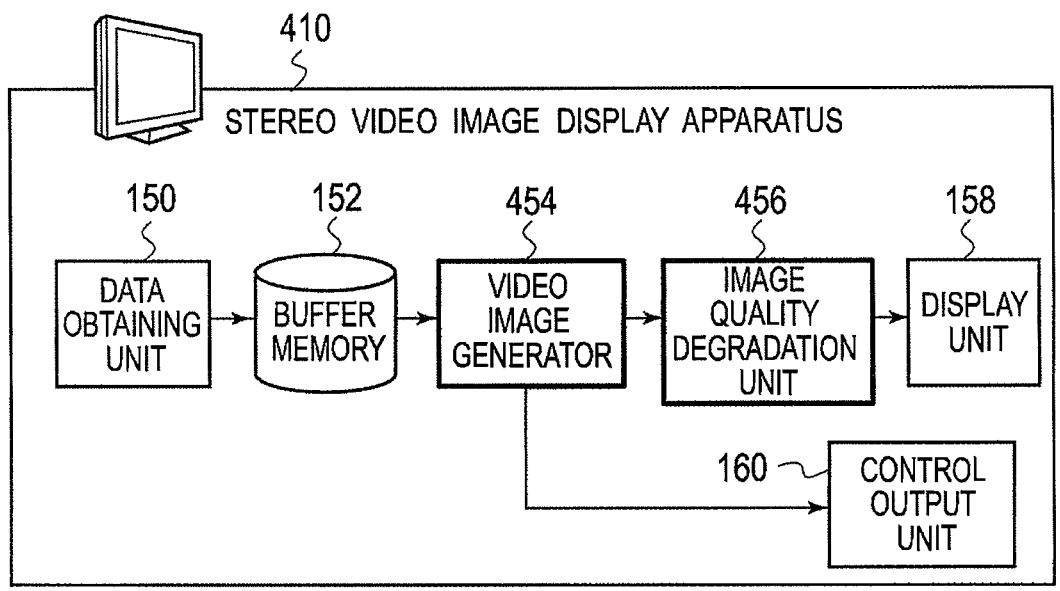
FIG. 10 is a functional block diagram showing a schematic connection relationship of a stereo video image display apparatus in a second embodiment.

FIG. 10 is a functional block diagram showing a schematic connection relationship of the stereo video image display apparatus 410 in the second embodiment. As shown in FIG. 10, the stereo video image display apparatus 410 includes a data obtaining unit 150, a buffer memory 152, a video image generator 454, an image quality degradation unit 456, a display unit 158, and a control output unit 160. Each of the data obtaining unit 150, the buffer memory 152, the display unit 158, and the control output unit 160 which were already described as the constituents in the first embodiment, has substantially the same function, thereby duplicated explanation will be omitted.

The video image generator 454 reads out the stereo video image data sequentially from the buffer memory 152, and generates left eye video image data sequence and right eye video image data sequence by repeating frame data corresponding to one frame in two times for the respective left eye video image data and the right eye video image data composing the stereo video image data.

Then, the video image generator 454 generates sequential data in which the continuing left eye video image data sequence and the continuing right eye video image data sequence are arranged alternately. Further, the video image generator 454 generates a control signal which controls opening and closing of the shutter glasses 120 according to the generated sequential data.

The image quality degradation unit 456 is configured with a filter and performs the image quality degradation processing which degrades the image quality by providing filtering for the object data in the generated sequential data. While, in the above described first embodiment, the object data includes both frame data sets before and after the switching between the left eye video image data and the right eye video image data; in the present embodiment, the object data is frame data after the switching between the left eye video image data and the right eye video image data.

Figure 11:
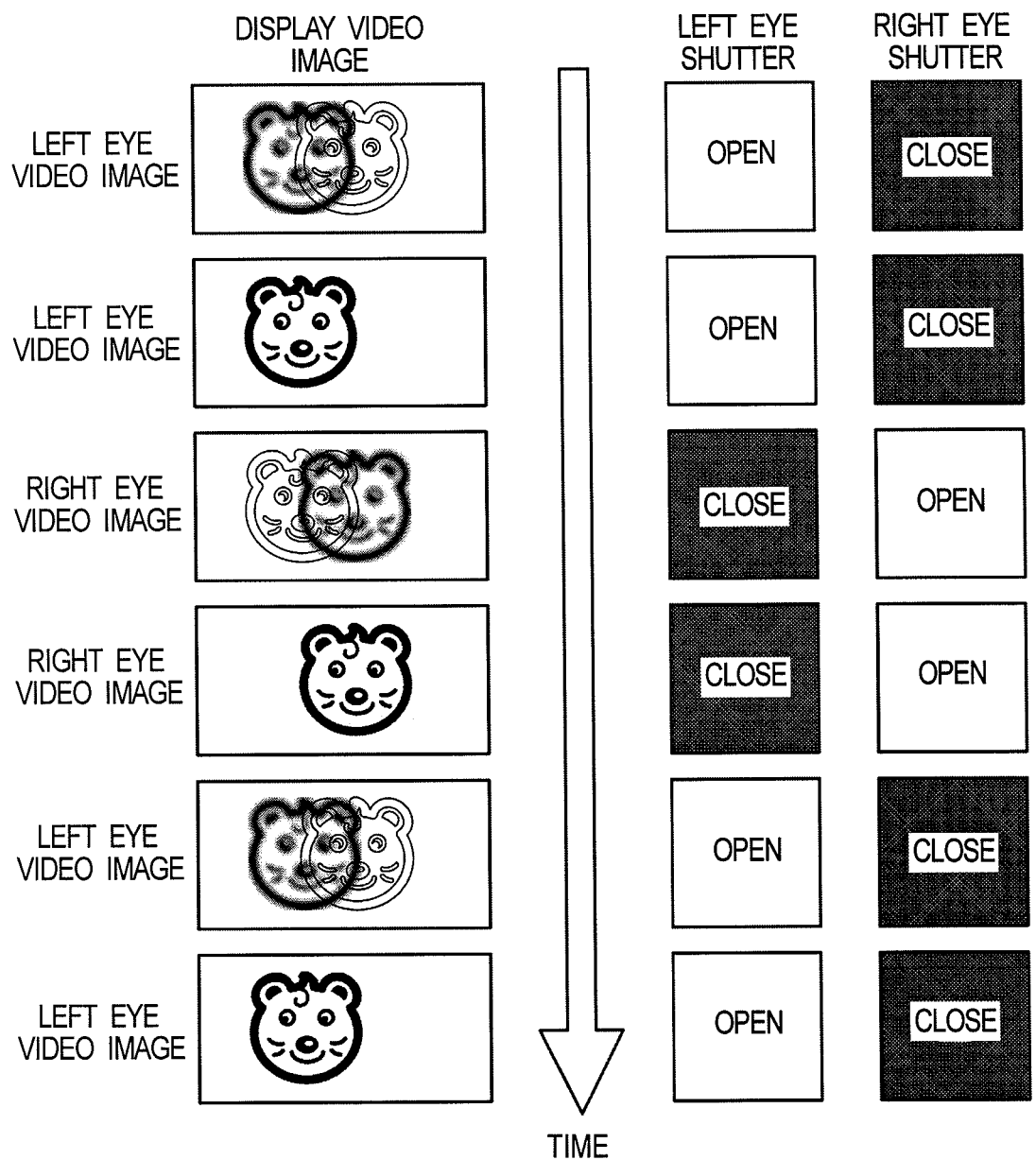
FIG. 11 is an explanatory diagram for explaining a video image to be displayed on a display unit and opening and closing timing of shutter glasses in the second embodiment.

FIG. 11 is an explanatory diagram for explaining a video image to be displayed on the display unit 158 and opening and closing timing of the shutter glasses 120 in the second embodiment.

As shown in FIG. 11, the image quality degradation unit 456 sets the frame data after the switching between the left eye video image and the right eye video image as the object data, and provides the image quality degradation processing similar to the image quality degradation unit 156. That is, the image quality degradation unit 456 provides the processing of obscuring an outline in the object data. Then, since the subsequent video image becomes obscure, the crosstalk is not recognized clearly. Accordingly, it becomes unnecessary to shield this video image with the shutter glasses 120.

For this purpose, the video image generator 454 generates a control signal which, for the left eye video image data, opens the left eye shutter 224 and closes the right eye shutter 226 in the shutter glasses 120 for the whole period in which the video image according to the frame data repeated in two times is displayed, and, for the right eye video image data, closes the left eye shutter 224 and opens the right eye shutter 226 in the shutter glasses 120 for the whole period in which the video image according to the frame data repeated in two times is displayed. According to this control signal, a shutter controller 222 of the shutter glasses 120 opens and closes the left eye shutter 224 and the right eye shutter 226.

In this manner, the stereo video image display apparatus 410 can open each of the left eye shutter 224 and the right eye shutter 226 for a half time of the whole period and does not reduce the video image brightness.

In the second embodiment, the previous video image is not obscured and the video image mixed into the subsequent video image (crosstalk) is not also obscured. In the first embodiment, the previous video image is also obscured and a video image mixed into the subsequent video image is also obscured. Accordingly, compared to the second embodiment, the crosstalk in the subsequent video image is not recognized clearly in the first embodiment.

In the second embodiment, however, the whole video image is also obscured in the subsequent video image, thereby the crosstalk is not recognized clearly compared to the case without the image quality degradation processing. Further, in the first embodiment, the video image according to the same frame data is to be displayed continuously in three times for each of the left eye video image data and the right eye video image data. In the present embodiment, however, the same frame data may be displayed continuously in two times and it is possible to reduce a processing load of the stereo video image display apparatus 410.

Further, since the image quality degradation unit 456 provides the image quality degradation processing using the frame data after the switching between the left eye video image and the right eye video image as the object data, a clear video image which is not provided with the image quality degradation processing is displayed again in the same frame on the display unit 158 after the video image provided with the image quality degradation processing has been displayed. In this case, since the video image displayed afterward is visually recognized dominantly, the stereo video image display apparatus 410 can cause the crosstalk not to be recognized clearly, while causing the user 130 to visually recognize a clear video image.

While, in the present embodiment, the image quality degradation unit 456 uses the frame data after the switching between the left eye video image and the right eye video image as the object data, the frame data before the switching between the left eye video image and the right eye video image may be used as the object data. In this case, the previous video image is obscured and a video image mixed into the subsequent video image is also obscured. Accordingly, it is possible to effectively cause the crosstalk in the subsequent video image not to be recognized clearly.

(Stereo Video Image Display Method)

Next, there will be explained a stereo video image display method which displays the sequential data using the above described stereo video image display apparatus 410. FIG. 12 is a flowchart showing a whole flow of the stereo video image display method in the second embodiment. As in the first embodiment, the processing shown in FIG. 12 is carried out repeatedly at a predetermined frame period while the stereo video image display apparatus 410 is instructed to display the sequential data.

The data obtaining unit 150 obtains one frame of the stereo video image data from the video image reproduction apparatus 102, for example, and stores the stereo video image data into the buffer memory 152 (S300). The video image generator 454 reads out one frame of the stereo video image data from the buffer memory 152, and generates the left eye video image data sequence and the right eye video image data sequence by repeating the frame data corresponding to one frame in two times for the respective left eye video image data and right eye video image data composing the stereo video image data (S502).

The video image generator 454 generates the sequential data in which the continuing left eye video image data sequence and the continuing right eye video image data sequence are arranged alternately (S504).

The following processing from a control signal generation step S306 to a frame data selection step S308 is substantially the same as the processing explained in the first embodiment, and therefore the same signs are provided and explanation will be omitted.

Then, the image quality degradation unit 456 determines whether or not the selected frame data is the frame data after the switching between the left eye video image data and the right eye video image data (whether the object data or not) (S510).

The following processing from an image quality degradation processing step S312 to a frame finish determination step S318 is substantially the same as the processing explained in the first embodiment, and therefore the same signs are provided and explanation will be omitted.

Also by such a stereo video image display method, it is possible to reduce the crosstalk between the left eye video image and the right eye video image without reducing the video image brightness and to improve the visibility of the video image.

In the above described first embodiment, the frame data sets corresponding to both of one frame before and one frame after the switching between the left eye video image data and the right eye video image data are used as the object data. However, the object data may be either one of the frame data sets before and after the switching between the left eye video image data and the right eye video image data.

Further, while, in the above described second embodiment, the image quality degradation unit 456 is explained for the case of causing the object data to pass through the filter to obscure an outline of an object in the object data; however, the image quality degradation unit 456 may reduce the contrast range of the object data similar to the image quality degradation unit 256.

Further, in the above described first embodiment and second embodiment, the image quality degradation unit 156 and 456 are explained for the case of causing the object data to pass through the filter to obscure an outline of an object in the object data. In the variation example, the image quality degradation unit 256 is explained for the case of reducing the contrast range of the object data. In any of the embodiments, however, the image quality degradation unit may cause the object data to pass through the filter to obscure an outline of an object in the object data and also may reduce the contrast range of the object data at the same time. In this case, for each of the obscuring processing and the contrast range reduction processing for the object data, the image quality degradation unit can reduce the crosstalk sufficiently even when strength in each of processing is weaken, compared to the case of only providing either one of the processing. Accordingly, the image quality degradation unit can suppress the image quality degradation through the image quality degradation processing to a minimum.

Note that each processing of the stereo video image display method in the present specification not always needs to be performed in a temporal sequence along the order described in the flowchart, and parallel processing or processing by a subroutine may be included.

What is claimed is:

1. A stereo video image display apparatus comprising:
   a data obtaining unit that obtains left eye video image data and right eye video image data for stereo video image perception by binocular parallax;
   a video image generator that generates sequential data in which a left eye video image data sequence repeating the obtained left eye video image data three times and a right eye video image data sequence repeating the obtained right eye video image data three times are arranged alternately to generate a control signal which controls opening and closing of shutter glasses according to the sequential data;
   an image quality degradation unit that processes image quality degradation for object data which is frame data corresponding to either one of one frame before switching between the left eye video image data and the right eye video image data and one frame after the switching or object data which is frame data corresponding to two frames before and after the switching, in the sequential data; and
   a display unit that displays a video image according to the sequential data after image quality of the object data has been degraded.

2. The stereo video image display apparatus according to claim 1, wherein the image quality degradation unit degrades the image quality of the object data by obscuring an outline in the object data.

3. The stereo video image display apparatus according to claim 2, wherein the image quality degradation unit obscures the outline in the object data by causing the object data to pass through a filter.

4. The stereo video image display apparatus according to claim 1, wherein the image quality degradation unit degrades the image quality of the object data by reducing a contrast range of the object data.

5. The stereo video image display apparatus according to claim 1, wherein the video image generator generates the control signal which opens a left eye shutter and closes a right eye shutter in the shutter glasses for a whole period in which a video image according to the left eye video image data sequence is displayed, and closes the left eye shutter and opens the right eye shutter in the shutter glasses for a whole period in which a video image according to the right eye video image data sequence is displayed.

6. The stereo video image display apparatus according to claim 1, wherein the object data is the frame data corresponding to one frame after the switching between the left eye video image data and the right eye video image data, in the sequential data.

7. A stereo video image display method comprising:
   obtaining left eye video image data and right eye video image data for stereo video image perception by binocular parallax;
   generating sequential data in which a left eye video image data sequence repeating the obtained left eye video image data three times and a right eye video image data sequence repeating the obtained right eye video image data three times are arranged alternately to generate a control signal which controls opening and closing of shutter glasses according to the sequential data;
   processing image quality degradation for object data which is frame data corresponding to either one of one frame before switching between the left eye video image data and the right eye video image data and one frame after the switching or object data which is frame data corresponding to two frames before and after the switching, in the sequential data; and
   displaying a video image according to the sequential data after image quality of the object data has been degraded.

8. The stereo video image display method according to claim 7, wherein the processing degrades the image quality of the object data by obscuring an outline in the object data.

9. The stereo video image display method according to claim 8, wherein the processing obscures the outline in the object data by causing the object data to pass through a filter.

10. The stereo video image display method according to claim 7, wherein the processing degrades the image quality of the object data by reducing a contrast range of the object data.

11. The stereo video image display method according to claim 7, wherein the generating generates the control signal which opens a left eye shutter and closes a right eye shutter in the shutter glasses for a whole period in which a video image according to the left eye video image data sequence is displayed, and closes the left eye shutter and opens the right eye shutter in the shutter glasses for a whole period in which a video image according to the right eye video image data sequence is displayed.

12. The stereo video image display method according to claim 7, wherein the object data is the frame data corresponding to one frame after the switching between the left eye video image data and the right eye video image data, in the sequential data.

* * * * *